United States Patent [19]

Weber et al.

[11] Patent Number: 4,460,920
[45] Date of Patent: Jul. 17, 1984

[54] AUTOMATICALLY TRAVELING TUBE-INTERIOR MANIPULATOR FOR REMOTELY CONTROLLED TRANSPORTATION OF TESTING DEVICES AND TOOLS ALONG GIVEN FEEDPATHS, PREFERABLY FOR NUCLEAR REACTOR INSTALLATIONS

[75] Inventors: Robert Weber, Uttenreuth; Alois Köppl, Wolframs-Eschenbach; Siegfried Förner; Erich Kohlert, both of Erlangen; Otto Müller, Effeltrich, all of Fed. Rep. of Germany

[73] Assignee: Kraftwerk Union Aktiengesellschaft, Mülheim, Fed. Rep. of Germany

[21] Appl. No.: 316,900

[22] Filed: Oct. 30, 1981

[30] Foreign Application Priority Data

Mar. 25, 1981 [DE] Fed. Rep. of Germany ....... 3111814

[51] Int. Cl.³ .............................................. H04N 7/18
[52] U.S. Cl. ..................................... 358/100; 73/623; 165/11 A; 414/728; 414/729; 414/751
[58] Field of Search ...................... 358/100; 165/11 A; 414/728, 729, 751; 73/622, 623

[56] References Cited

U.S. PATENT DOCUMENTS

| | | | |
|---|---|---|---|
| 3,852,526 | 12/1974 | McCullough | 358/100 |
| 3,852,527 | 12/1974 | McQuivey | 358/100 |
| 3,862,359 | 1/1975 | McCullough | 358/100 |
| 4,216,893 | 8/1980 | Glatthorn | 414/728 |
| 4,272,781 | 6/1981 | Taguchi | 358/100 |

FOREIGN PATENT DOCUMENTS 1064100 8/1959 Fed. Rep. of Germany ...... 358/100
2807232 8/1978 Fed. Rep. of Germany .

Primary Examiner—Howard Britton
Attorney, Agent, or Firm—Herbert L. Lerner; Laurence A. Greenberg

[57] ABSTRACT

Automatically traveling tube-interior manipulator for the remotely controlled transportation of testing devices and tools along given feedpaths through the tube interior, including a stepping mechanism having at least two links including a rear stepping body and a front counterstepping body as seen in the direction of entry into the tube, at least one gimbal-type joint hinging the bodies to each other, clamping devices disposed on each of the bodies for clamping the bodies to the inner periphery of the tube, driving means associated with at least one of the bodies for transporting the stepping body in the axial direction of the tube relative to the counterstepping body when the clamping device of the stepping body is engaged and the clamping device of the counterstepping body is disengaged and vice versa, guiding elements disposed on the outer periphery of each of the bodies for transportation along the inner periphery of the tube, a line reservoir disposed outside the tube, a flexible harness of supply lines connected from the rear stepping body to the line reservoir, and a manipulator head mounted on the front counterstepping body for the testing devices and tools.

20 Claims, 18 Drawing Figures

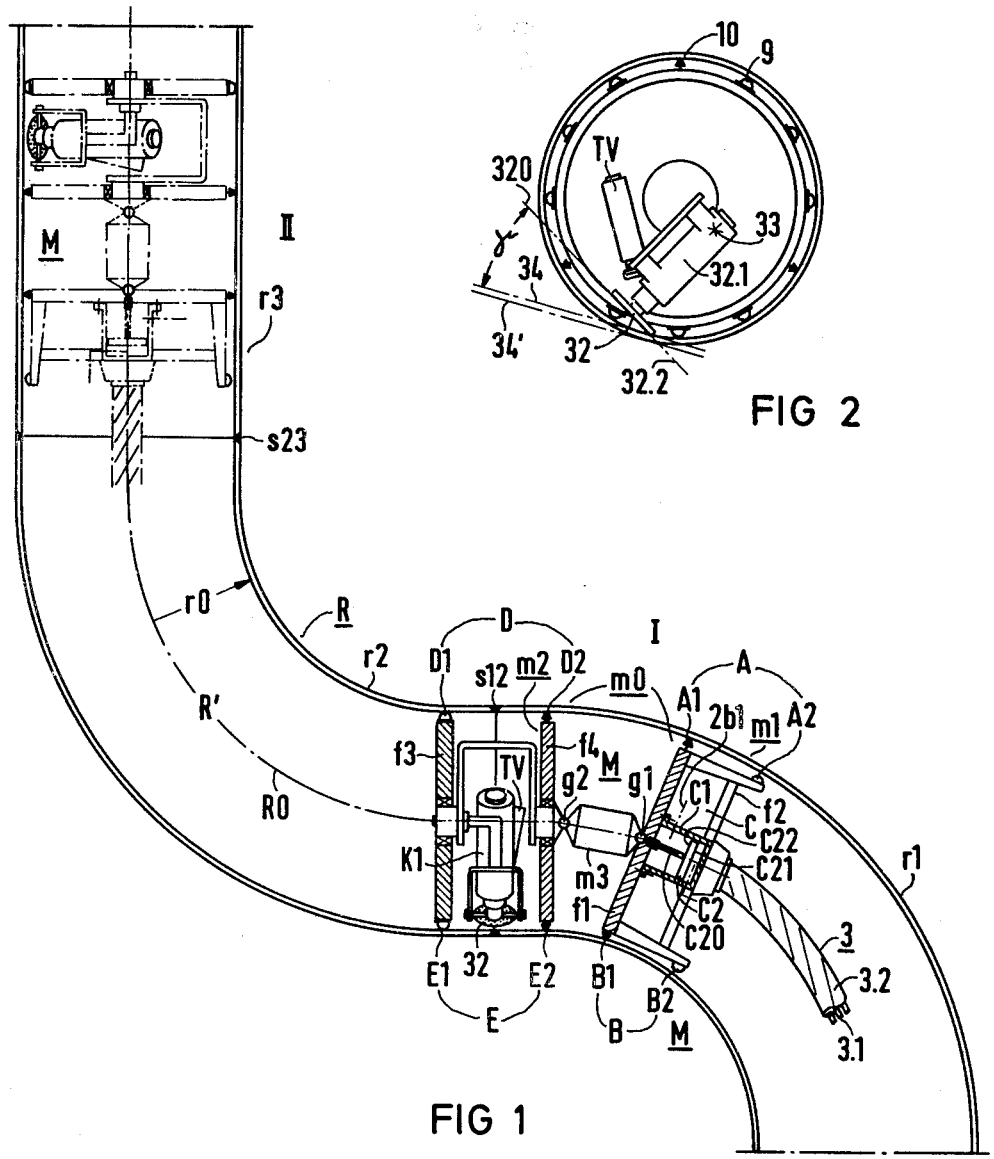

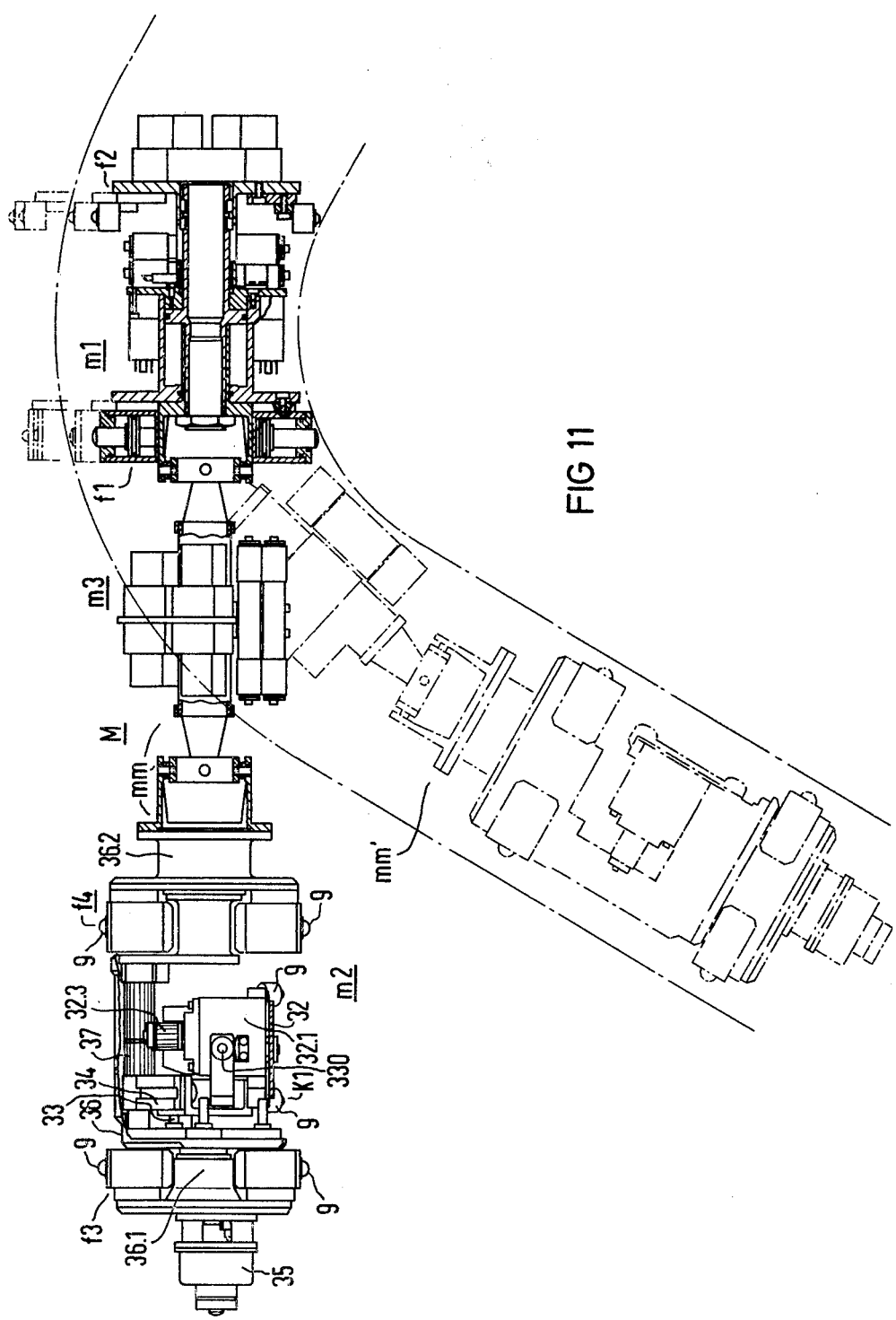

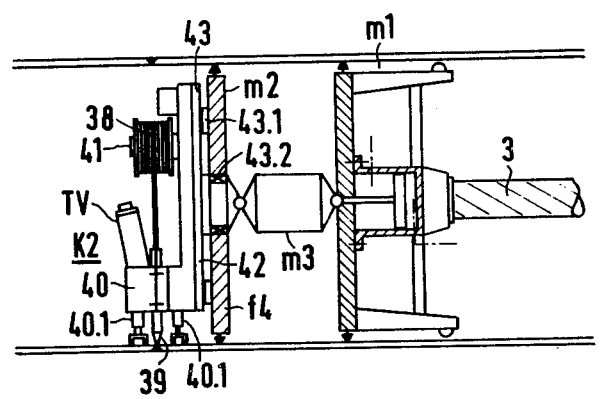
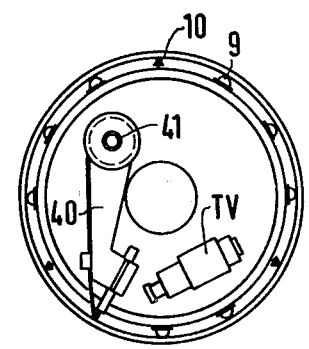
FIG 12  FIG 13
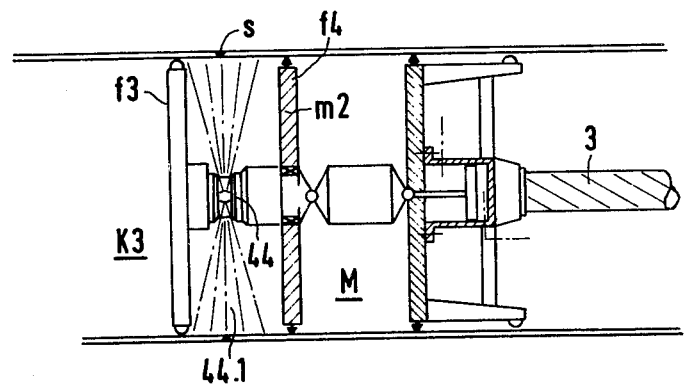
FIG 14
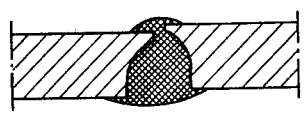 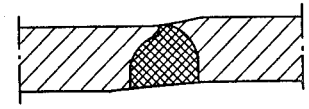
FIG 17  FIG 18

AUTOMATICALLY TRAVELING TUBE-INTERIOR MANIPULATOR FOR REMOTELY CONTROLLED TRANSPORTATION OF TESTING DEVICES AND TOOLS ALONG GIVEN FEEDPATHS, PREFERABLY FOR NUCLEAR REACTOR INSTALLATIONS

The invention relates to a tube-interior manipulator for the remotely controlled transportation of testing devices and tools along given feedpaths through the tube interior, especially along curved and vertical tube sections, preferably for tubular conduits of nuclear reactor installations.

A tube-interior manipulator is known from German Published, Non-Prosecuted Application DE-OS No. 28 07 232 and is referred to as a self-propelled vehicle therein. The known tube-interior manipulator includes a body with at least one driving and steering wheel in contact with a surface over which the vehicle moves. The body has at least two swiveling hinged arms ending in support devices which move by sliding or rolling over a surface opposite the wheel contact zone. A device is provided which transmits a swivel moment to the arms in such a manner that the arms support themselves against the opposite surface, pushing the driving wheel against a wheel contact zone thereof as a reactive effect. While it is supposedly possible with the known vehicle to also traverse vertical areas, this meets with basic difficulties because in such areas the driving wheel and the arms must remain in constant contact with the inside wall of the tube. Balancing of the forces of friction and the forces of gravity so that no areas are slipped or dropped through, is difficult. In contrast thereto, it is an object of the invention to provide an automatically traveling tube-interior manipulator for remotely controlled transportation of testing devices and tools along given feedpaths, preferably for nuclear reactor installations, which overcomes the hereinafore-mentioned disadvantages of the heretofore-known devices of this general type, and which is capable not only of traversing tubular conduit sections which are curved and have tubular branches, but to also make it possible to traverse vertical tube sections without difficulties and without the danger of slippage or change of position. Such a tube-interior manipulator is of special significance for the reason that where tubular conduits that are either drawn or welded from tube sections are involved, there is a need for inspection with test equipment or for treatment with tools from the inside. This should furthermore be done by remote control, because they may involve not only neutral, but already contaminated, tubular conduits in nuclear reactor installations. There is a particular need for example, to regrind or reweld, circular or longitudinal seams from the inside, and to inspect them with TV cameras or with ultrasonic test equipment, etc. The particularly important point here is the adherence to precise feed, test and machining paths.

With the foregoing and other objects in view there is provided, in accordance with the invention, as automatically traveling tube-interior manipulator for the remotely controlled transportation of testing devices and tools along given feedpaths through the tube interior, especially along curved and vertical tube sections, preferably for tubular conduits of nuclear reactor installations, comprising a stepping mechanism having at least two links including a rear stepping body and a front counterstepping body as seen in the direction of entry into the tube, at least one gimbal-type joint hinging the bodies to each other, clamping devices disposed on each of the bodies for clamping the bodies to the inner periphery of the tube, driving means associated with at least one of the bodies for transporting the stepping body in the axial direction of the tube relative to the counterstepping body when the clamping device of the stepping body is engaged and the clamping device of the counterstepping body is disengaged and vice versa, guiding elements disposed on the outer periphery of each of the bodies for sliding or rolling transportation along the inner periphery of the tube, a line reservoir disposed outside the entered tube conduit, a flexible harness of supply lines connected from the rear stepping body to the line reservoir, and a manipulator head mounted on the front counterstepping body for the testing devices and/or tools.

In accordance with another feature of the invention, the driving means is associated with the stepping body.

In accordance with a further feature of the invention the driving means includes a stepping cylinder disposed in the stepping body and a stepping piston being movable lengthwise through a piston stroke in the cylinder, the piston having first and second sides able to be acted upon by a pressure medium, the stepping body being movable through a step corresponding to the piston stroke when the first piston side is acted upon by the pressure medium and the counterstepping body is locked by the clamping device, and the counterstepping body being movable through a step corresponding to the piston stroke when the second piston side is acted upon by the pressure medium and the stepping body is locked by the clamping device.

In accordance with an added feature of the invention, there is provided an intermediate member having the gimbal-type joints at two ends thereof hinging the bodies to the intermediate member, the intermediate member being in the form of a support body for control elements such as valves and switches.

In accordance with an additional feature of the invention, there is provided at least one support flange formed on each of the bodies having outer peripheries with contours being spaced from the inner periphery of the tube at a given ring gap, and the guiding elements and clamping devices distributed over the outer peripheries of the support flanges and projecting beyond the contours.

In accordance with again another feature of the invention, the clamping devices are in the form of clamping piston and cylinder devices having two sides able to be acted upon for moving the piston and being fastened to the support flange and disposed radially in ray or spoke from about the center thereof, the cylinder having faces, and the pistons having rods penetrating the faces and having spherical clamping surfaces for contacting the inner periphery of the tube.

In accordance with again a further feature of the invention, the guiding elements are ball and roller inserts being fastened to the support flange and radially distributed in ray or spoke form about the center thereof.

In accordance with again an added feature of the invention, one of the ball and roller inserts is disposed in mirror-symmetrical fashion tangentially adjacent to and on each side of the clamping devices on the support flange.

In accordance with again an additional feature of the invention, the piston and cylinder devices are pneumatic devices.

In accordance with yet another feature of the invention, the driving means are hollow to allow the supply lines to pass therethrough, and the gimbal-type joints are free in the center thereof.

In accordance with yet a further feature of the invention, there is provided a support flange disposed on each of two ends of the stepping body.

In accordance with yet an added feature of the invention, there is provided a support flange disposed on each of two ends of the counterstepping body defining a space therebetween, the manipulator head being disposed in the space.

In accordance with yet an additional feature of the invention, the manipulator head includes a tube-interior grinding machine having a bearing and driving part being adjustable mounted about an axis parallel to the axis of the tube, and a grinding wheel mounted on the bearing and driving part in a grinding wheel plane forming an acute approach angle with a tangent to the tube wall at a contact point of the grinding wheel.

In accordance with still a further feature of the invention, the manipulator head includes a tube-interior welding machine having a bearing and driving part for a welding electrode and a welding rod, and a pivot pin being disposed parallel to the axis of the tube, the bearing and driving part being mounted on the pivot pin.

In accordance with another feature of the invention, there is provided a gamma irradiator disposed on the manipulator head for irradiating tube seams.

In accordance with a further feature of the invention, the manipulator head is in the form of an ultrasonic testing device.

In accordance with an added feature of the invention, there is provided a lighting system and a television camera being attached to the manipulator head and focusable on areas to be machined and areas to be inspected. In accordance with an additional feature of the invention, the driving means includes an electromagnetic drive being disposed in the stepping body or the other body and including a solenoid device being operable in two directions of force and having at least one armature and a rod coupling the armature to the counterstepping body or the other body through the gimbal-like joint, the stepping body being pulled toward the counterstepping body through a given step when the solenoid device is energized in one of the directions of force and the counterstepping body is locked by the clamping device, and the counterstepping body being pushed away from the stepping body through the given step when the solenoid device is energized in the other of the directions of force and the stepping body is locked by the clamping device, or vice versa for motion in the other direction.

In accordance with again another feature of the invention, the driving means is in the form of a spindle-traveling nut drive including a spindle rotatably mounted on the stepping body having a free end and being drivable in two rotary directions by a motor, and a traveling nut being non-rotatably mounted on the free end of the spindle and being axially movable with respect to the spindle, the traveling nut being rigidly joined to the counterstepping body, the spindle being divided into at least two sections being hinged together by the at least one gimbal-type joint, and means coupling the bodies to each other for allowing mutual axial motion and preventing mutual twisting of the bodies relative to each other.

In accordance with a concomitant feature of the invention, there is provided a pivot pin disposed transverse to the axis of the tube on which the portal-like bearing and driving part is pivotable, the guiding elements being pushable by the bearing and driving part against the inner periphery contour of the tube, and a preferably pneumatic positioning cylinder providing pneumatic bearing pressure for moving the pivot pin transverse to the axis of the tube toward the tube wall, the bearing pressure always being greater than grinding forces resulting from the feeding force of the grinding wheel and reactive grinding forces.

The advantages achievable through the use of the invention are especially to be seen in that a universally applicable, automatically traveling, tube-interior manipulator has been created with a stepping mechanism that enables it to traverse narrow tube elbows and steep or even vertical tube sections, so that the test devices or tools attached to the manipulator head can be positioned and moved along their feedpaths.

Other features which are considered as characteristic for the invention are set forth in the appended claims.

Although the invention is illustrated and described herein as embodied in an automatically traveling tube-interior manipulator for remotely controlled transportation of testing devices and tools along given feedpaths, preferably for nuclear reactor installations, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic cross-sectional view of the tube-interior manipulator of the invention, shown in two positions inside a curved tubular conduit, the manipulator head being equipped with a tube-interior grinding machine;

FIG. 2 is a top-plan view of the grinding head of the manipulator according to FIG. 1;

FIG. 11 is a partly cross-sectional and partly elevational view of the entire manipulator with the stepping body, intermediate member, counterstepping body and attached grinding head in a straight and in a bent position;

FIGS. 12 to 14 are diagrammatic views of other embodiments of the manipulator head, shown inside the tubular conduit as in FIG. 1, FIG. 12 being a cross-sectional view of the manipulator with a welding head, FIG. 13 being a top-plan view of the welding head according to FIG. 12, and FIG. 14 being a view similar to FIG. 12 of the manipulator with a gamma irradiator;

FIGS. 17 and 18 are cross-sectional views of offset tubes before and after grinding, respectively.

Figure 3:
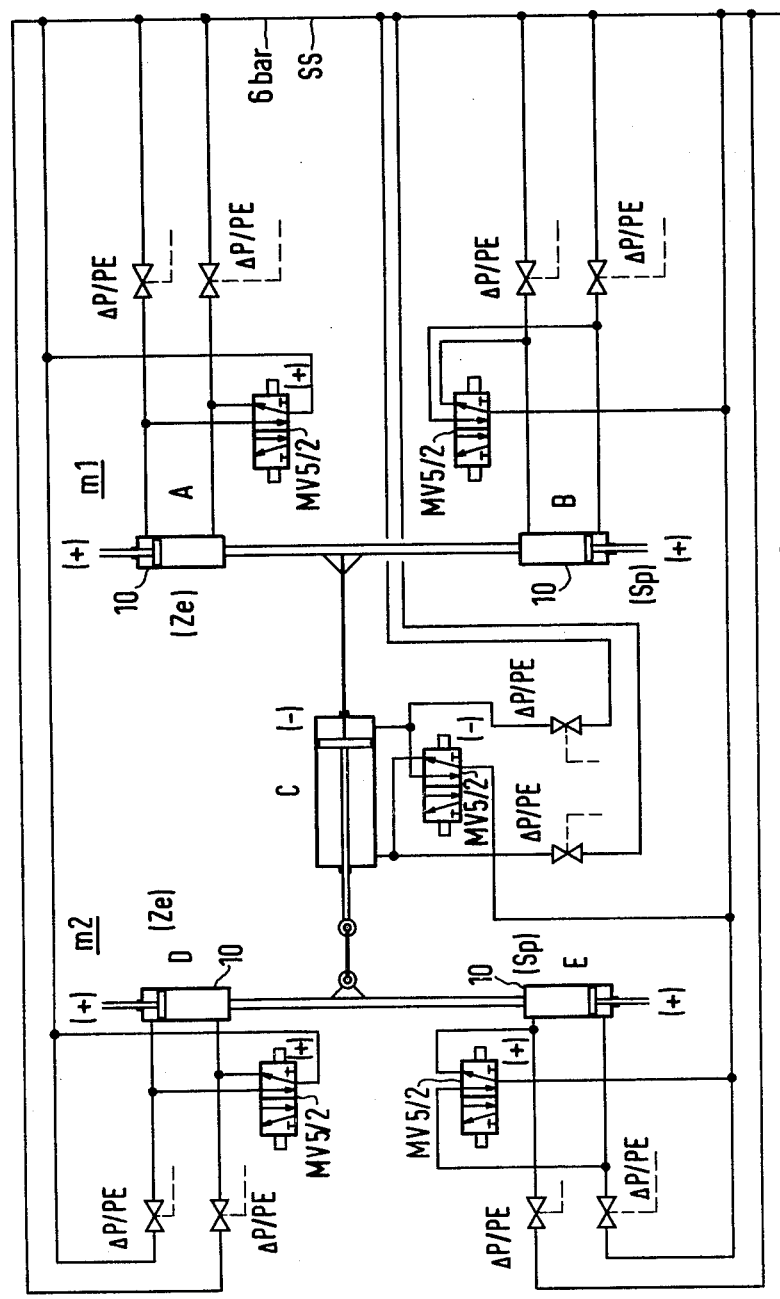
FIG. 3 is a simplified diagrammatic and schematic wiring diagram of the electropneumatic control for the stepping piston and for the clamping piston of the clamping device.

Referring now to the figures of the drawing and first, particularly, to FIG. 1 thereof, it is seen that the tube-interior manipulator generally designated with reference symbol M serves for the remote-controlled transportation of testing devices and tools along given feedpaths through the tubular interior R' of a tubular conduit generally designated with reference symbol R. The conduit R is shown as a cutout portion with three tube sections r1, r2, r3 welded together; the section r1 forming a first (90°) tube elbow, the section r2 forming a second (90°) tube elbow adjacent to the tube section r1 in an S shape, and the upper tube section r3 forming a tubular conduit section extending vertically. The circular welding seams between sections r1 and r2 are designated with reference symbol s12 and those between sections r2 and r3 are designated with reference symbol s23.

As is evident from FIG. 1, the manipulator M is capable of traversing vertical and horizontal conduit as well as relatively sharply-curved tubular conduit sections by remote control and is also capable of being locked therein in any desired position. In position I shown in the lower part of FIG. 1, for example, the welding seam s12 can be ground from the inside; for this purpose, the manipulator head K1, mounted to the counterstepping body m2, is constructed as a tube-interior grinding machine. Position II represents an intermediate position; the manipulator M, having just ground the welding seam s23 from the inside, is on its way to the next welding seam, not shown in FIG. 1.

As FIG. 1 shows in principle, the stepping mechanism m0 of the manipulator M includes a stepping body m1 and a counterstepping body m2. Both bodies m1, m2 are provided with pneumatic clamping devices A, B and D, E, respectively, (which will be more explicitly described further on herein) to clamp the bodies m1, m2 to the inside diameter of the tube. The means for providing motion of the stepping body m1 in the axial direction of the tube relative to the counterstepping body m2, when the clamping devices A, B of the stepping body m1 are extended or engaged, and when the devices D, E of the counterstepping body m2 are retracted or disengaged and vice versa, include a stepping cylinder C1 rigidly jointed to the stepping body m1, and a stepping piston C2 which is mounted in the stepping cylinder C1 so as to be axially movable and so as to be able to be acted upon on both sides. A piston rod C20 of the piston C2 is hinged to the counterstepping body m2 by an intermediate member m3 having at least one gimbal-like or universal joint g1, g2. In the embodiment shown, the stepping body m1 is hinged to the intermediate member m3 by a first gimbal joint g1 and the counterstepping body is hinged to the intermediate member by a second gimbal joint g2. In the illustrated embodiment, the counterstepping body supports the manipulator head K1 in a tube-interior grinding machine which can be exactly centered relative to the tube axis R0 in its operating position between the support flanges f3 and f4 of the counterstepping body m2, and therefore relative to the orbit of the welding seam s12. The clamping devices of the two support flanges f3, f4 are designated with reference symbols D, E as a whole and with symbols D1, E1 and D2, E2 individually, while the support flanges of the stepping body are designated with reference symbols A, B as a whole and symbols A1, B1 and A2, B2 individually. The guiding element on the support flanges f1, f2, f3 and f4 for transportation along the inside diameter of the tube by sliding or rolling are not shown in FIG. 1; they are preferably distributed over the circumference of the support flanges, each between successive clamping devices, but they will be described more expilicitly by way of FIGS. 5 and 6 hereinbelow.

A flexible harness 3 of electrical and pneumatic supply lines 3.1 is connected to the manipulator M or its stepping mechanism m0. The harness 3 is fed in from its rear side (facing the non-illustrated tube entry opening), is encased in a protective sheath 3.2, and is fed to the stepping mechanism from a line reservoir that is also not shown. If the tubular conduit R is inclined downward or runs down vertically, the harness 3 may simultaneously serve as a safety mechanism against dropping; the harness must then be constructed with the tensile strength required for this purpose. If the manipulator M is to travel up an incline or vertically upward, a rope may be provided as safety mechanism against dropping. One end of the rope may be suspended from the center of the support flange f3, for instance, and can be wound on a lockable rope drum through a handhole at the upper end of the tube section to be traversed. This rope may remain slack because the manipulator M is moved by means of its stepping mechanism m0.

The manipulator M (the head K1 thereof will be described later) is stepped as follows: It is assumed that the manipulator M should first be moved from a position I further up by a first half step. To accomplish this, the stepping body m1 is locked by means of its clamping devices A, B while the clamping devices D and E of the counterstepping body m2 are disengaged from the tube wall. Pressure is then applied to one piston side C21 while the other piston side C22 is pressure-relieved, whereby the counterstepping body m2, and with it the intermediate member m3 and the manipulator head K1 constructed as grinding head, is moved through a step corresponding to the stroke of the piston C2. If this were the testing or operating position, all clamping devices A to E would be returned into their clamping position and held there; but if the manipulator M is to be advanced through another half step, only the counterstepping body m2 remains locked, whereas the stepping body m1 with the clamping devices A and B is disengaged from the inside wall of the tube. In this way, when pressure is applied to the piston side C22, the stepping body m1 with its cylinder C1 is pulled up by the second half step, the step length again being determined by the piston stroke. The intermediate member m3 with the two gimbal joints g1, g2 at its two ends enables the manipulator M to traverse tubes with relatively sharp bends.

Figure 5:
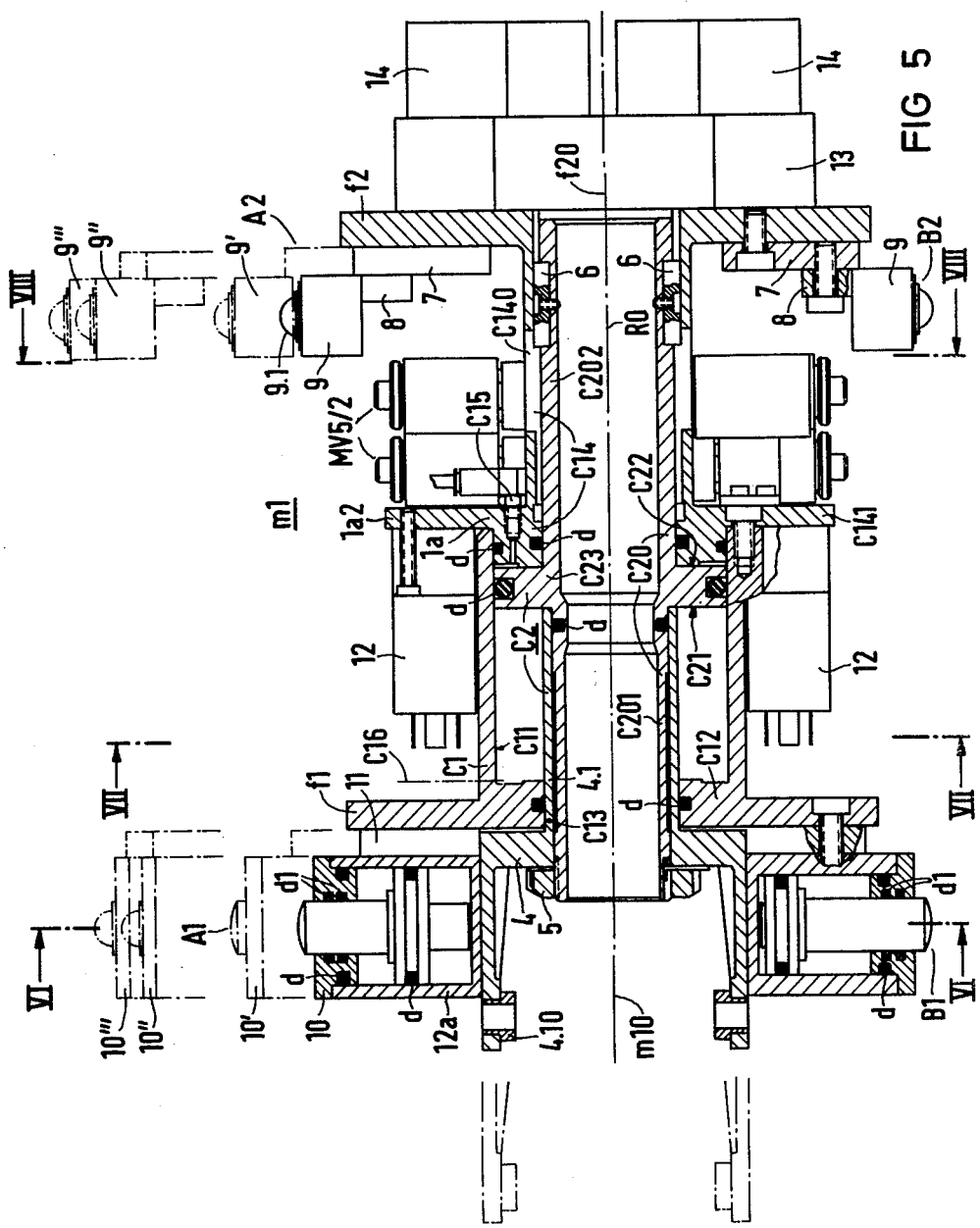
FIG. 5 is an axial cross-sectional view of the stepping body of the manipulator stepping mechanism.
Figure 6:
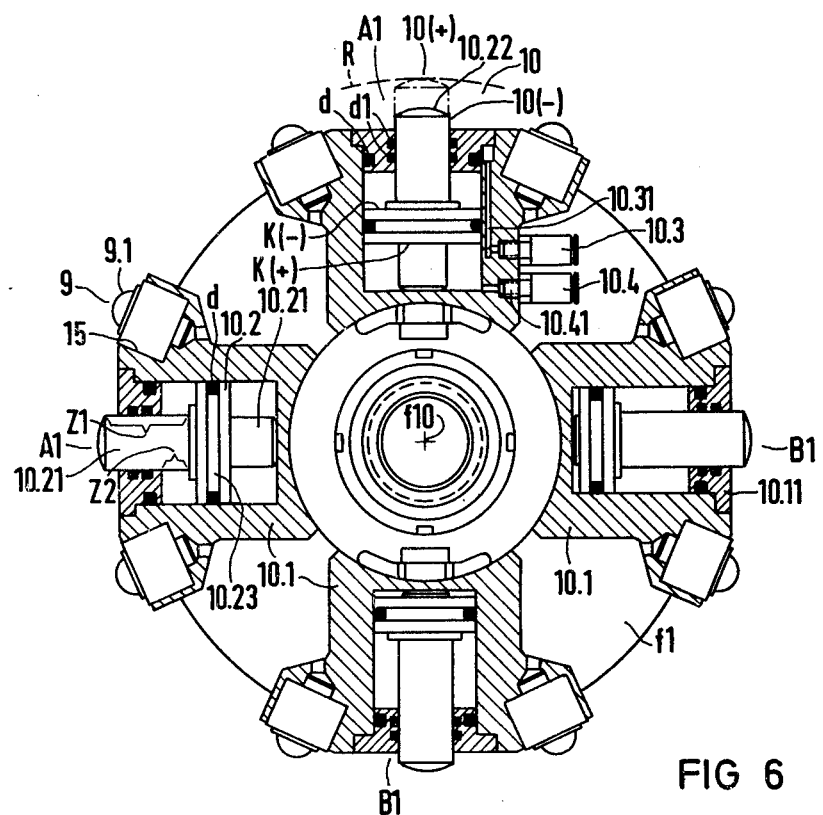
FIG. 6 is a cross-sectional view of a support flange with clamping devices and guiding elements, taken along the line VI—VI in FIG. 5, in the direction of the arrows.
Figure 7:
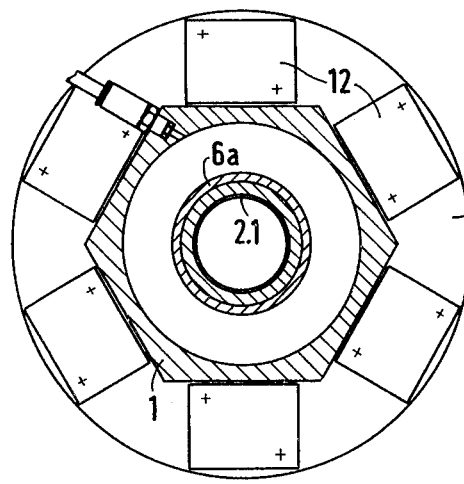
FIG. 7 is a cross-sectional view of the hexagonal outer contour of the stepping cylinder with pressure switches mounted to the stepping cylinder flange, taken along the line VII—VII in FIG. 5, in the direction of the arrows.
Figure 8:
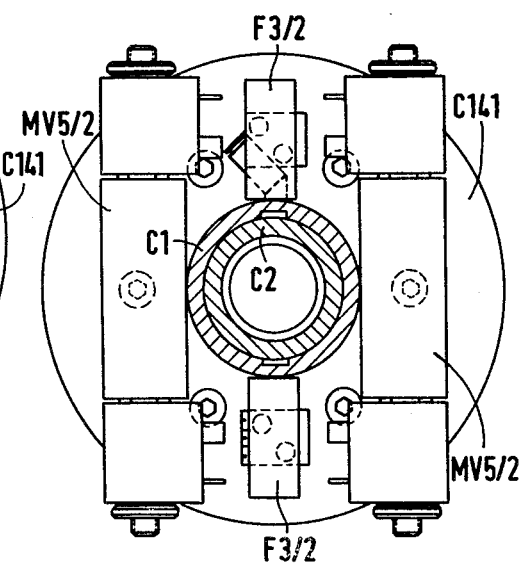
FIG. 8 is a cross-sectional view of the control valves of the electropneumatic control mounted to the other side of the stepping cylinder flange, taken along the line VIII—VIII in FIG. 5, in the direction of the arrows.
Figure 10:
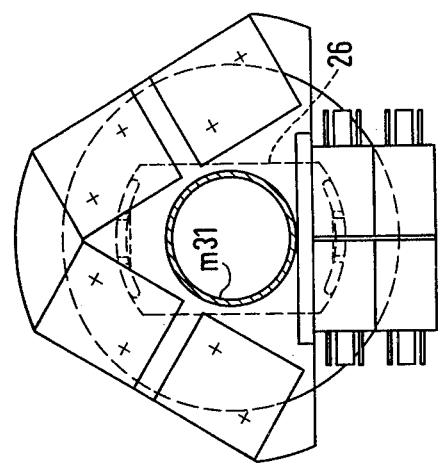
FIG. 10 is a side elevational view of the intermediate member of FIG. 9.

FIGS. 3 and 10 show details of the stepping body m1 and the intermediate member m3, components corresponding to FIG. 1 having the same reference symbols. The stepping piston C2, as especially seen in FIG. 5, is constructed as a hollow piston with the piston rod C20 being hollow for the accomodation of the supply lines 3.1. The piston rod C20 has a front end C201. A neck part 4.1 of a joint fork 4 is pushed over the end C201 and fastened by means of a shaft nut 5 screwed to the free end of the piston rod so as to be secure against twisting. A piston flange C23 is guided by a cylinder wall C11 in such a way as to be movable lengthwise. The neck part 4.1 and with it the piston rod part C201 are guided by the flanks of an opening C13 formed in a cylinder bottom C12. The other piston rod end C202 is guided in the neck part C140 of a double flange part C14. The left flange portion C141 of the double flange part C14 forms a second cylinder bottom and the right flange portion thereof is the already-mentioned support flange f2. For a precise sliding fit, adjustable keys 6 which are fastened to the outer circumference of the rod part C202, slide in corresponding longitudinal slots in the inner circumference of the neck part C140. Ball and roller inserts 9 are screwed on in radial or spoke arrangements relative to the center of a supporting flange f20 as guide elements, through intermediate plates 7 and 8 disposed in step fashion. The inserts 9 may also roll along the inside wall of the tube by means of outwardly projecting steel balls 9.1 (the ball bearing inside the inserts 9 has been omitted for the sake of simplicity because such inserts are known in the art). The contours of increasingly larger diameter shown in dot-dash lines indicate that the support flange f2 and the fastening circle of the inserts 9 can be selected in different diameters for adaptation to different inside tube diameters. The same increase in diameter is possible for the clamping devices shown in the left half of FIG. 5 and in FIG. 6 and designated with reference symbol 10 as a whole. For the associated support flange f1, contours 10', 10" and 10''' of respectively increasing diameter are shown in dot-dash lines. While the sectional plane of the support flange f2 has been placed in such a way that the guiding elements 9 are recognizable, the axial sectional plane of the support flange f1 has been placed in such a way that the clamping devices 10 can be seen. The cylinder housing 10.1 of the clamping devices 10 seen in FIG. 6 is screwed through an adapter plate 11 to the support flange f1 shown in FIG. 5 which is an integral part of the cylinder bottom C12. One side of the flange part C141 of the double flange component C14 serves for the mounting of pressure switches 12 which, as FIG. 7 shows in greater detail, are grouped around the hexagonal outer circumference of the stepping cylinder 1, resulting in very good space utilization. In addition, the flange part C141 also has compressed air connections C15 used to move the stepping piston C2 in one direction. Compressed air line connections C16 indicated in dot-dash lines serve for moving the stepping piston C2 in the other direction. As FIG. 8 shows most clearly, also attached to the double flange component C14 are larger solenoids MV5/2 and smaller pneumatic valves F3/2. The reference symbol 5/2 refers to two switching states at 5 compressed air connections and the symbol 3/2 refers to two switching states at 3 compressed air connections. In all places designated with reference symbol d in FIG. 5, sealing rings are inserted in appropriate annular slots to seal the sliding surfaces between the piston C2 and the cylinder C1, to seal the area between the double flange component C14 and the adjacent cylinder and piston surfaces, or to seal the clamping devices 10. Connected to the supporting flange f2 of the stepping body m1 is a base plate 13, which has differential pressure switches 14 mounted to the outside thereof.

FIG. 6 shows by way of the support flange f1, used as a typical example for all support flanges, that it is provided with clamping devices 10 and guiding elements 9 which are distributed over and project beyond its outer contour. The clamping devices include double-acting clamping piston-cylinder assemblies which are disposed radially or in spoke fashion with respect to the support flange f1, and are located around the center f10 of the support flange f1. The piston rods 10.21 of the piston 10.2 has spherical clamping surfaces 10.22 projecting outwardly through a face wall 10.11 of the cylinder housing 10.2, that can be made to contact the inner circumference of the tube indicated in a dashed line at reference symbol R. The extended clamping position of the piston rod is designated with reference symbol 10(+) and indicated in broken lines; the retracted position is designated with reference symbol 10(−). A sealing ring d is again inserted in an annular slot 10.23 of the piston flange and another sealing ring d is inserted in an annular slot in the outside diameter of the cylinder cover 10.11. The slide rings d1 inserted in appropriate annular slots in the inner circumference of the cylinder cover 10.11 may be equipped with a lubricant reservoir (see FIG. 5 as well as FIG. 6). Reference symbols 10.3 and 10.4 represent connecting nipples for pressure hoses acting through appropriate compressed air channels 10.31 and 10.41, respectively, either upon the outer piston side (K(−) for retraction or upon the inner position side K(+) for extension of the piston rod 10.21. As may be seen in the drawing, four clamping devices 10 arranged in an X shape are provided for each support flange. Furthermore, one ball/roller insert 9 is mounted in each of several appropriate seats 15 of the cylinder housing 10.1 in a mirror-symmetrical arrangement tangentially adjacent to and on both sides of each clamping device 10. Therefore, four clamping devices 10 and eight ball/roller inserts 9 are provided for each supporting flange. The clamping devices 10 and guiding elements 9 which are evenly distributed over the circumference of the supporting flange, assure that branches coming off the tube can be traversed as well.

Two groups of clamping devices 10 are provided for all of the support flanges f1 to f4 shown in FIG. 1. Therefore, one must differentiate, e.g. in support flange f1 shown in FIG. 6, between group A1 which serves for centering the stepping mechanism m0 relative to the tube axis R0, and group B1 which furnishes the clamping forces after the stepping mechanism m0 is centered. It is for this reason that in group A1 the piston flange is mounted to a distance Z1 from the free piston rod end and at a distance Z2 from the cylinder cover, so that the distance from the center f10 to the surface 10.22 corresponds to the respective inside tube radius ro in the extended position 10(+) of the two group A1 pistons seen in FIG. 1. This means that the clamping devices A1 (and correspondingly the clamping devices A2, D1 and D2) are being adjusted to the inside tube diameter before entering the tube. Accordingly, the clamping devices A1, B1; A2, B2; D1, E1 and D2, E2 of each support flange are self-centering for each step or for each half step.

FIG. 3 shows a simplified wiring diagram of the electropneumatic control, each stepping body and counter-stepping body m1 and m2, respectively, being drawin with only two clamping devices each, representing the group A and B in the case of the body m1 and the groups D and E in the case of the body m2, A and D being the centering and B and E the clamping piston groups. With the exception of the stepping pistons C, all clamping pistons are shown in their extended (+) position, i.e. the stepping mechanism m0 is clamped at all supporting flanges. Reference symbol SS refers to a 6 bar compressed air busbar; the busbar having a venting pressure of 0.5 bar and its branches are not shown. Except stepping pulse lines of ΔP/PE switch combinations indicated by broken lines, the electrical control lines are not shown for bettery clarity. In FIG. 3, the following reference symbols have been assigned:

MV5/2 are the solenoids already mentioned above;

ΔP/PE are the switch combinations including a differential pressure switch and a pneumatic-electric transducer, a ΔP switch thereof transmits a pressure signal to close a contact bridge of a PE transducer when the coordinated positioning piston (which may be a stepping or a clamping piston) reaches its (+) end position, the transducer thus transmitting an electrical signal. Analogously, a signal is also given upon reaching the (−) end position, namely an 0 signal to open the contact bridge of the PE transducer;

simultaneously flooded with compressed air through the two pressure medium-actuated 3/2 flooding valves F3/2, F3/2. In this flooded position, the C-piston "floats" in its cylinder housing. If the valve M5/2 is then actuated briefly or keyed, either in the (+) sense or in the (−) sense, the C-piston wil make very short steps either in the (+) or in the (−) direction so that a fine positioning of the manipulator head can be carried out in this manner (which is checked with the television camera TV, seen in FIGS. 1, 2 and 13, for instance).

The differential pressure switches ΔP, individually designated with reference symbols ΔP1 and ΔP2, each have two terminals for pressure pulse lines p6 connected to the 6 bar bus SS2, and for lines p6,0 which are either connected to the 6 bar bus SS1 or to the 0.5 bar line, depending on the position of the valve M5/2. Since the line p6,0 of the switch ΔP2 is connected to the line SS1, the coupled transducer PE2 is in its closed position. On the other hand, the transducer PE1 is in its open position because the line P6,0 is pressure-relieved by the switch ΔP1. The respective piston end position C(−) or C(+) can be made visible by signal lights connected to the contacts of the transducer PE1 and to a voltage source. The differential pressure switches ΔP1 and ΔP2 are additionally marked by an &$_z$ reference symbol.

Figure 9:
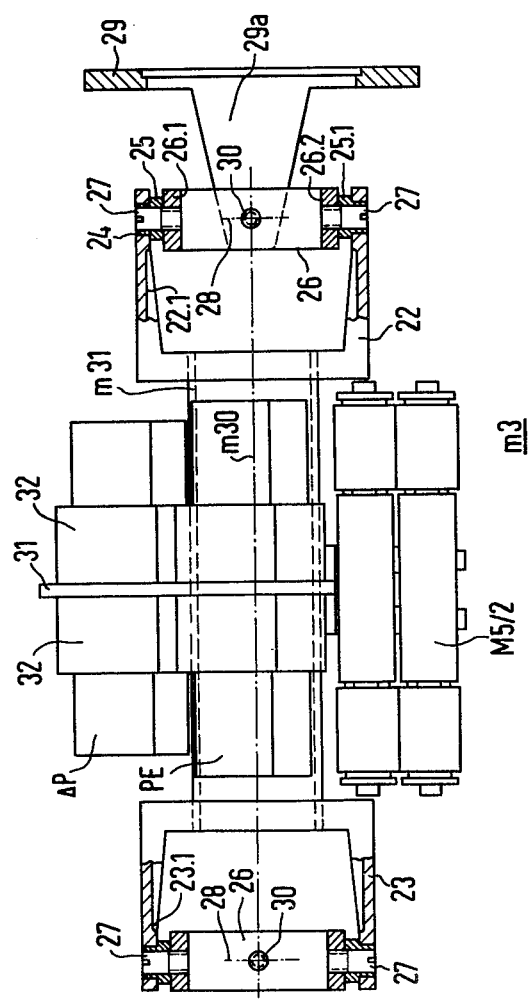
FIG. 9 is a front elevational view of an intermediate member serving to couple the stepping body to the counterstepping body carrying the manipulator head.

FIG. 9 shows that the intermediate member m3 includes a support body M31 in sleeve form with gimbal forks 22 and 23 at the ends thereof, and gimbal bushings 25 with a collar 25.1 being inserted in gimbal fork ends 22.1, 23.1 in appropriate holes 24. Gimbal frames 26, having the contour of a circular arc as shown in FIG. 10, can pivot about the gimbal joints axis 28 by means of straight pins 27 screwed into upper and lower parts 26.1, 16.2 of the frame 26. A fork 29a of a coupling flange 29 is coupled to the gimbal frame 26 by means of

| Designation of Steps | Designation of Commands | Command Sequence when Stepping Forward and Backward ||||||||||
| | | A || B || C || D || E ||
| | | MV 5/2 | Piston | MV 5/2 | Piston | MV 5/2 | Piston | MV 5/2 | Piston | MV 5/2 | Piston |
|---|---|---|---|---|---|---|---|---|---|---|---|
| 1 Step Forward | Normal Position | (+) | (+) | (+) | (+) | (−) | (−) | (+) | (+) | (+) | (+) |
| | First Half Step F | | | | | | | | | | |
| | 1. Release D, E | (+) | (+) | (+) | (+) | (−) | (−) | (−) | (−) | (−) | (−) |
| | 2. Stepping C forward | (+) | (+) | (+) | (+) | (+) | (+) | (−) | (−) | (−) | (−) |
| | 3. Centering at D | (+) | (+) | (+) | (+) | (+) | (+) | (+) | (+) | (−) | (−) |
| | 4. Clamping at D, E | (+) | (+) | (+) | (+) | (+) | (+) | (+) | (+) | (+) | (+) |
| | Second Half Step F | | | | | | | | | | |
| | 5. Release A, B | (−) | (−) | (−) | (−) | (+) | (+) | (+) | (+) | (+) | (+) |
| | 6. Stepping C forward | (−) | (−) | (−) | (−) | (−) | (−) | (+) | (+) | (+) | (+) |
| | 7. Centering at A | (+) | (+) | (−) | (−) | (−) | (−) | (+) | (+) | (+) | (+) |
| | 8. Clamping at A, B | (+) | (+) | (+) | (+) | (−) | (−) | (+) | (+) | (+) | (+) |
| 1 Step Backward | First Half Step | | | | | | | | | | |
| | 1. Release A, B | (−) | (−) | (−) | (−) | (−) | (−) | (+) | (+) | (+) | (+) |
| | 2. Stepping C backward | (−) | (−) | (−) | (−) | (−) | (+) | (+) | (+) | (+) | (+) |
| | 3. Centering at A | (+) | (+) | (−) | (−) | (+) | (+) | (+) | (+) | (+) | (+) |
| | 4. Clamping at A, B | (+) | (+) | (+) | (+) | (+) | (+) | (+) | (+) | (+) | (+) |
| | Second Half Step | | | | | | | | | | |
| | 5. Release D, E | (+) | (+) | (+) | (+) | (+) | (+) | (−) | (−) | (−) | (−) |
| | 6. Stepping C backward | (+) | (+) | (+) | (+) | (−) | (−) | (−) | (−) | (−) | (−) |
| | 7. Centering at D | (+) | (+) | (+) | (+) | (−) | (−) | (+) | (+) | (−) | (−) |
| | 8. Clamping D, E | (+) | (+) | (+) | (+) | (−) | (−) | (+) | (+) | (+) | (+) |

(Ze) in FIG. 3 indicates that A and D are centering pistons, (Sp) means that B and E are clamping pistons.

Figure 4:
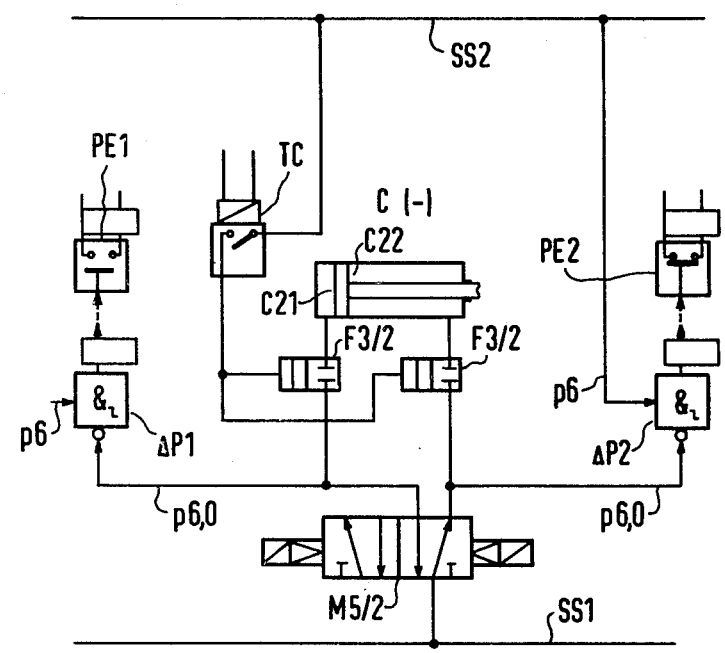
FIG. 4 is a view similar to FIG. 3 of the wiring diagram of an individual multiple-way valve with an associated differential pressure switch and a pressure switch serving as a PE transducer (C piston)

FIG. 4 shows, in a larger scale, the C piston with a sideways-reversed C-cylinder housing for reasons of better representation, and the associated solenoid M5/2 with ΔP/PE switch combinations connected. Also shown with drawing is a key-operated solenoid TC with which the two piston sides C21 and C22 can be appropriate straight pins (not shown in detail) so that the coupling flange 29 and the intermediate member m3 can also pivot about the first gimbal joint axis 30 relative to each other. The counterstepping body m2 is flanged to the coupling flange as shown in detail in the overall view according to FIG. 11. The fork 23 (shown in the left half of FIG. 9), just as is the case with the fork 22, has a second gimbal joint axis 30 perpendicular to the drawing plane, to which the gimbal fork 4 of the stepping body m1 shown in FIG. 5 is to be coupled by appropriate joint bushings 4.1 and non-illustrated straight pins. To accomplish this purpose the intermediate member m3 would have to be turned through 90° about its longitudinal axis or the stepping body m1 with its fork 4 would hve to be turned through 90° about its longitudinal axis m10. The sleeve-shaped support body m31 of the intermediate member m3 is provided with a central support flange 31, from two flanges sides of which base plate parts 32 of polygonal contour extend. The flange 31 and the base plate parts 32 serve for fastening the 5/2 solenoids M5/2, pressure switches or transducers PE and differential pressure switches $\Delta P$. For better clarity, the connecting electro-pneumatic control lines are omitted in FIGS. 9 and 10 as well as in FIGS. 1, 2 and 5 to 11. FIG. 11 shows the manipulator M with the stepping body m1, intermediate member m3, counterstepping body m2 and manipulator head K1, in a straight position mm assumed by the manipulator when entering or traversing straight tube sections. The manipulator assumes the curved position mm', indicated by dot-dash lines, inside a curving tube section, for example. A tube section with an extreme 90° bend is shown in FIG. 11 to illustrate that travel through such bends is effortlessly accomplished due to the gimbal joints and the intermediate member m3.

The simplified view of the grinding head K1 according to FIG. 2 shows that the bearing and driving parts 32.1 of a grinding wheel 32 is mounted so as to be adjusted about a tube parallel axis 33 in such a manner that a grinding wheel plane 320, indicated by a straight dot-dash line, forms an acute approach angle with a tube wall tangent 34 formed into the respective grinding wheel contact point 32.2. The outer tube wall tangent is marked with reference symbol 34', and an approach angle $\gamma = 30°$ is shown. The smaller this angle, the shallower the grinding depth and the greater the grinding width.

This is of special significance for grinding a tube interior where a welding seam to be ground away and the grinding operation can be watched only through the television camera TV. As a result, arbitrarily gentle transitions are obtained, even when tube sections aree offset, as shown in FIG. 17 (before grinding) and in FIG. 18 (after grinding). To allow grinding to a smooth surface even in case of a tube offset (see FIGS. 17, 18), the driving and bearing part 32.1 of the grinding wheel 32 (see FIG. 11) can pivot about an axis 330 transverse to the tube. Therefore, when the driving and bearing part 32.1 with its rolling parts 9 is pushed against the tube wall by positioning cylinders (not labelled in detail), the rolling parts 9 are adjusted in accordance with the tube offset, and the grinding wheel 32 can therefore be sensitively brought into grinding engagement by means of its feed drive 32.3 which includes an electric motor with a non-illustrated spindle/traveling nut drive. Inside the part 32.1, a drive motor for the grinding wheel, such as a pneumatic motor, is provided. The revolving frame 36, which is rotatably mounted to the support flanges f3 and f4 within the bearing housings 36.1 and 36.2, can be caused to rotate slowly about the tube axis by a revolving motor 35 with a reduction gear. The positioning motor 37 serves for the fine axial adjustment of the cylinder 34 and therefore for the adjustment of the part 32.1 and the grinding wheel 32 mounted therein. The lighting system and the television camera TV are not shown in FIG. 11; they may be attached to the part 32.1.

In diagrammatic views corresponding to FIGS. 1 and 2, FIGS. 12 and 13 show that a manipulator head K2 in form of a tube-interior welding machine is fastened to the counterstepping body m2. Again, reference symbole TV refers to the television camera (it goes without saying that in addition to the television camera a lighting system must be present here, but is not shown, however), symbole 38 is a welding rod supply fed through a welding electrode 39 to the welding site, and symbol 40.1 are feet of a driving and bearing part 40. The axis 41 of the welding rod supply 38 coincides with the pivot axis for the driving and bearing part 40. The part 40 sits on a turntable 42 which is mounted to the support flange f4 by means of thrust and radial bearings 43.1, 43.2, and is rotated slowly in the circumferential direction for feeding by drive motors, which are not labelled in detail. FIG. 12 also shows that a single support flange f4 is sufficient for the manipulator head K2, even though two support flanges for each manipulator link result in greater clamping forces.

FIG. 14 shows that a gamma irradiator for the irradiation of tube seam s is mounted to the counterstepping body m2 of the manipulator M in the form of a manipulator head K3. A cone of rays 44.1 emanating from the positioned ray source 44 covers the entire circumference of the welding seam s. Flaws which may be present in the welding seam s are made visible on non-illustrated radiation-sensitive films or photographic plates disposed on the outside of the tube. It is also possible to couple other inspection or repair equipment to the manipulator M, such as an ultrasonic testing device.

Figure 15:
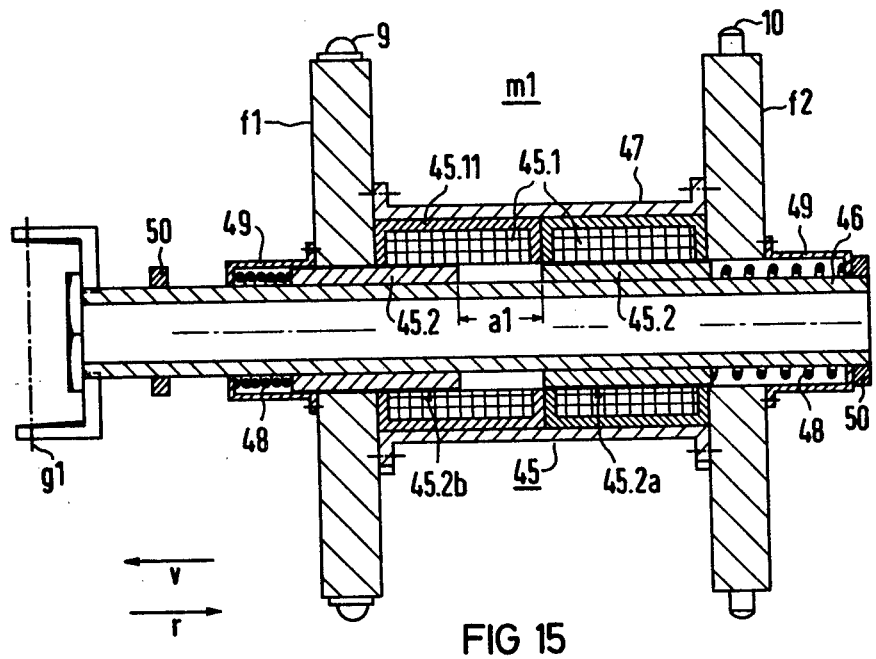
FIG. 15 is a cross-sectional view of another embodiment of the invention, showing an electromagnetic drive for the stepping mechanism with a field coil and an armature.

In the manipulator embodiment according to FIG. 15, the means for motion thereof in the axial direction of the tube includes an electromagnetic drive 45 in which the stepping body m1 contains a solenoid arrangement 45.1 acting in both force directions and two associated armatures 45.2. The armatures 45.2 are rigidly mounted as sleeve-shaped ferromagnetic parts to a hollow cylindrical coupling rod 46, the left end of which is coupled to the counterstepping body (not shown in FIG. 15) through at least one gimbal-like joint g1. Each one of the two solenoids 45.1 is enclosed by a pot magnet housing 45.11 in such a manner that when the solenoid is energized, the position of the associated armature 45.2 and an accordingly closed field line path results, whereas if the solenoid is not energized (position 45.2b of the armature), the armature is moved axially out of the solenoid. The support flanges are again designated with reference symbols f1, f2, and the guiding and clamping devices with symbols 9, 10. The double flange part 47 spaces the support flanges f1, f2 and unites them to form a mechanically rugged unit, accomodating the solenoid arrangement 45 in its interior. Helical compression springs 48 are disposed on both sides of the stepping body m1, the springs being disposed at the outer faces of the support flanges f1 and f2, respectively, within spring cups 49 connected to the support flanges, in such a way that they encircle the coupling rod 46. One of the ends of the springs rests against one of each of the armatures 45.2, while the other end thereof contacts the bottom of the respective spring cup 49. The springs serve returning and damping purposes. Two stop collars 50, being fixed to the outside diameter of the coupling rod 46 and making contact either with the bottom of the right spring cup 49 (which is shown) or with that of the left spring cup 49 in the top switch positions, serve for the exact definition of the two positions of the coupling rod 46. The two solenoids 45.2 have the defined mutual axial spacing a1 which also corresponds to the stroke of the stepping body m1. Naturally, this stroke can also be shortened, thus achieving a finer stepping sequence.

In the drawing there is a state shown in which the right solenoid 45.2 is energized aand its armature is attracted accordingly. If the right solenoid is deenergized and the left solenoid 45.1 is energized while the counterstepping body m2 is locked and the stepping body m1 is unlocked, the stepping body m1 will move one step in the direction of the arrow v (forward). If the stepping body m1 were then arrested in this position and the system energized as shown, i.e., the right solenoid energized and the left one deenergized, the counterstepping body would be moved by one step in the direction v. Analogously, the same would apply to the command sequence for stepping backwards in the direction r.

Figure 16:
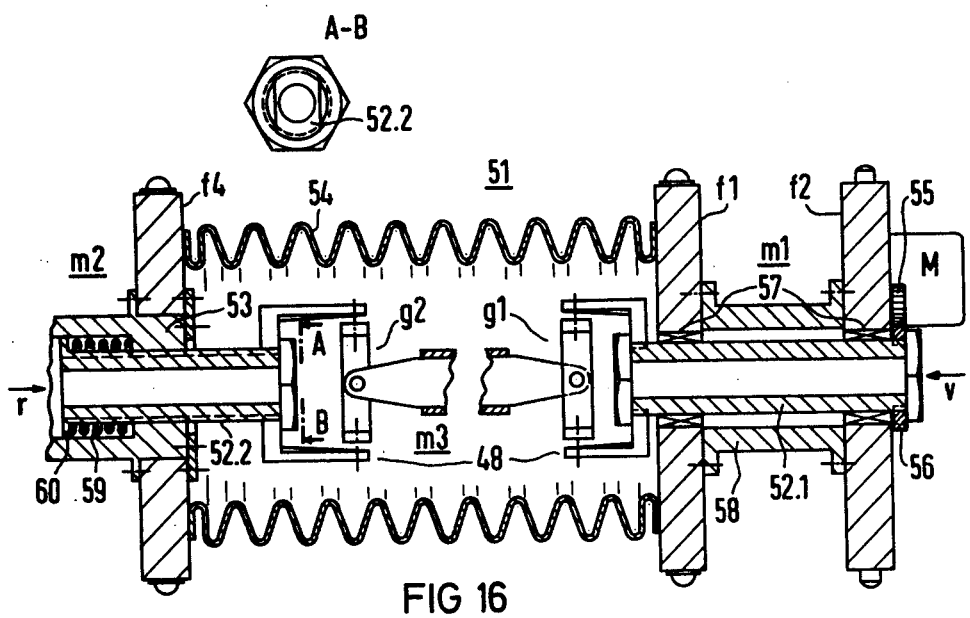
FIG. 16 is a fragmentary cross-sectional view of a further embodiment of the stepping mechanism of the invention, with a spindle/traveling nut drive.

Otherwise, the construction of the stepping mechanism m0 according to FIG. 15 is the same as that of the first embodiment example. Another stepping mechanism construction which allows stepping in particularly small as well as in bigger steps, is shown in FIG. 16. In FIG. 16 the means for the motion of the manipulator in the axial direction of the tube includes a spindle/traveling nut drive 15. Rotatably mounted to the stepping body m1 is a threaded spindle part 52.1 which can be driven in both rotary directions and is hinged to a second spindle part 52.2 through at least one gimbal-like joint g1, g2. Non-rotatably mounted to the latter, but axially guided, is a traveling nut 53 which is rigidly joined to the support flange f4 of the counterstepping body m2. The stepping body m1 and the counterstepping body m2 are coupled to each other by a corrugated tube 54 so that axial motion relative to each other is possible while twisting relative to each other is prevented. The ends of the corrugated tube, which preferably is formed of torsion-resistant alloy steel, are fastened to the support flanges f1 and f4, respectively, and it encloses the gimbal joints g1, g2 of the intermediate member m3, only a fragmentary portion of which is shown. A motor M, mounted to the outside of the support flange f2, especially an electric motor with a reduction gear, is coupled through a pinion 55 to the ring gear 56 of the threaded spindle part 52.1. The spindle part 52.1 is rotatably mounted to the stepping body m1, i.e. it is mounted to its support flanges f1, f2, by means of roller bearings and is enclosed by the hollow-cylindrical double flange part 58. The latter double flange part 58 unites the two support flanges f1, f2 to form a rigid, rugged structure, as already described with reference to the previous embodiment examples. Observing the stepping mechanism in direction v (forward), the counterstepping body m2 moves forward when its support flanges are unlocked whereas the support flanges f1, f2 of the stepping body are locked and the motor M is rotated counterclockwise (if the spindle 52 has a right-hand thread).

In detail:

| State of | | Rotation of | Motion of | |
|---|---|---|---|---|
| m1 | m2 | Motor M | m1 | m2 |
| locked | unlocked | counterclockwise | — | forward |
| unlocked | locked | clockwise | forward | — |
| unlocked | locked | counterclockwise | reverse | — |
| locked | unlocked | clockwise | —reverse | — |

In so-called keyed operation, short turning pulses can be imparted to the motor when needed so that only short steps are made. A helical compression spring 59 inserted between a spindle shoulder 60 and the traveling nut 53 serves the purpose of damping, i.e. buffering. Otherwise, the basic construction of the rest of the stepping mechanism or manipulator is as described in connection with the first embodiment.

Regarding FIG. 11, the following information is added below with respect to the very advantageous operating mode of the grinding head: It is evident that the portal-like driving and bearing part 32.1 is pivoted about a pivot pin 330 transverse to the tube in such a manner that its guiding parts 9 can be pushed against the inside wall of the tube to conform to the contour thereof; that the contact pressure is provided by a preferably pneumatic positioning cylinder adjusting the pivot axis, which is transverse to the tube, in the direction towards the tube wall; and that the pneumatic contact pressure is always greater than the grinding forces resulting from the grinding wheel feeding force and the reactive grinding forces. A ball screw has proven advantageous as a drive to feed in the grinding wheel 32 (because it produces little friction, little wear and gentle feeding). As may be seen, the feed direction coincides with the direction of the grinding wheel axis so that the approach angle γ (see FIG. 2) remains constant.

It is further to be added that the intermediate member m3 could also be equipped with the driving means (C, C1, C2) to move the stepping mechanism m0 in the axial direction of the tube, i.e. whenever it has not only a single gimbal joint g1, but two or more mutually spaced gimbal joints g1, g2.

We claim:

1. Automatically travelling tube-interior manipulator for the remotely controlled transportation of testing devices and tools along given feedpaths through the tube interior, comprising a stepping mechanism having at least two links including a rear stepping body and a front counterstepping body as seen in the direction of entry into the tube, at least one gimbal-type joint hinging said bodies to each other, clamping devices disposed on each of said bodies for clamping said bodies to the inner periphery of the tube, driving means associated with at least one of said bodies for transporting said stepping body in the axial direction of the tube relative to said counterstepping body when said clamping device of said stepping body is engaged and said clamping device of said counterstepping body is disengaged and vice versa, guiding elements disposed on the outer periphery of each of said bodies for transportation along the inner periphery of the tube, a line reservoir disposed outside the tube, a flexible harness of supply lines connected from said rear stepping body to said line reservoir, and a manipulator head mounted on said front counterstepping body for the testing devices and tools.

2. Manipulator according to claim 1, wherein said driving means is associated with said stepping body.

3. Manipulator according to claim 2, wherein said driving means includes a stepping cylinder disposed in said stepping body and a stepping piston being movable lengthwise through a piston stroke in said cylinder, said piston having first and second sides able to be acted upon by a pressure medium, said stepping body being movable through a step corresponding to the piston stroke when said first piston side is acted upon by the pressure medium and the counterstepping body is locked by said clamping device, and said counterstepping body being movable through a step corresponding to the piston stroke when the second piston side is acted upon by the pressure medium and said stepping body is locked by said clamping device.

4. Manipulator according to claim 1, including an intermediate member having said gimbal-type joints at two ends thereof hinging said bodies to said intermediate member, said intermediate member being in the form of a support body for control elements.

5. Manipulator according to claim 1, including at least one support flange formed on each of said bodies having outer peripheries with contours being spaced from the inner periphery of the tube at a given ring gap, and said guiding elements and clamping devices being distributed over the outer peripheries of said support flanges and projecting beyond said contours.

6. Manipulator according to claim 5, wherein said clamping devices are in the form of clamping piston and cylinder devices having two sides able to be acted upon for moving said piston and being fastened to said support flange and disposed radially about the center thereof, said cylinders having faces, and said pistons having rods penetrating said faces and having spherical clamping surfaces for contacting the inner periphery of the tube.

7. Manipulator according to claim 5 or 6, wherein said guiding elements are ball and roller inserts being fastened to said support flange and radially distribute about the center thereof.

8. Manipulator according to claim 7, wherein one of said ball and roller inserts is disposed in mirror-symmetrical fashion tangentially adjacent to and on each side of said clamping devices on said support flange.

9. Manipulator according to claim 3 or 6, wherein said piston and cylinder devices are pneumatic devices.

10. Manipulator according to claim 1, wherein said driving means are hollow to allow said supply lines to pass therethrough, and said gimbal-type joints are free in the center thereof.

11. Manipulator according to claim 4, including a support flange disposed on each of two ends of said stepping body.

12. Manipulator according to claim 11, including a support flange disposed on each of two ends of said counterstepping body defining a space therebetween, said manipulator head being disposed in said space.

13. Manipulator according to claim 1, wherein said manipulator head includes a tube-interior grinding machine having a bearing and driving part being adjustably mounted about an axis parallel to the axis of the tube, and a grinding wheel mounted on said bearing and driving part in a grinding wheel plane forming an acute approach angle with a tangent to the tube wall at a contact point of said grinding wheel.

14. Manipulator according to claim 1, wherein said manipulator head includes a tube-interior welding machine having a bearing and driving part for a welding electrode and a welding rod, and a pivot pin being disposed parallel to the axis of the tube, said bearing and driving part being mounted on said pivot pin.

15. Manipulator according to claim 1, including a gamma irradiator disposed on said manipulator head for irradiating tube seams.

16. Manipulator according to claim 1, wherein said manipulator head is in the form of an ultrasonic testing device.

17. Manipulator according to claim 13, 14, 15 or 16, including a lighting system and a television camera being attached to said manipulator head and focusable on areas to be machined and areas to be inspected.

18. Manipulator according to claim 1, wherein said driving means includes an electromagnetic drive being disposed in said stepping body and including a solenoid device being operable in two directions of force and having at least one armature and a rod coupling said armature to said counterstepping body through said gimbal-like joint, said stepping body being pulled toward said counterstepping body through a given step when said solenoid device is energized in one of said directions of force and said counterstepping body is locked by said clamping device, and said counterstepping body being pushed away from said stepping body through said given step when said solenoid device is energized in the other of said directions of force and said stepping body is locked by said clamping device.

19. Manipulator according to claim 1, wherein said driving means is in the form of a spindle-traveling nut drive including spindle rotatably mounted on said stepping body having a free end and being drivable in two rotary directions by a motor, and a traveling nut being non-rotatably mounted on the free end of said spindle and being axially movable with respect to said spindle, said traveling nut being rigidly joined to said counterstepping body, said spindle being divided into at least two sections being hinged together by said at least one gimbal-type joint, and means coupling said bodies to each other for allowing mutual axial motion and preventing mutual twisting of said bodies relative to each other.

20. Manipulator according to claim 13, including a pivot pin disposed transverse to the axis of the tube on which said bearing and driving part is pivotable, said guiding elements being pushable by said bearing and driving part against the inner periphery of the tube, and a positioning cylinder providing bearing pressure for moving said pivot pin transverse to the axis of the tube toward the tube wall, the bearing pressure always being greater than grinding forces resulting from the feeding force of said grinding wheel and reactive grinding forces.

* * * * *